(12) United States Patent
Tsirkin et al.

(10) Patent No.: US 10,459,748 B2
(45) Date of Patent: Oct. 29, 2019

(54) TRANSPARENT GUEST BASED NOTIFICATION OVERLAY

(71) Applicant: Red Hat Israel, Ltd., Ra'anana (IL)

(72) Inventors: Michael Tsirkin, Yokneam Illit (IL); Uri Lublin, Ra'anana (IL)

(73) Assignee: RED HAT ISRAEL, LTD., Ra'anana (IL)

( * ) Notice: Subject to any disclaimer, the term of this patent is extended or adjusted under 35 U.S.C. 154(b) by 30 days.

(21) Appl. No.: 15/202,307

(22) Filed: Jul. 5, 2016

(65) Prior Publication Data

US 2018/0012571 A1   Jan. 11, 2018

(51) Int. Cl.
G06F 9/455 (2018.01)
G09G 5/377 (2006.01)

(52) U.S. Cl.
CPC ......... *G06F 9/45558* (2013.01); *G09G 5/377* (2013.01); *G06F 2009/45579* (2013.01); *G09G 2340/12* (2013.01); *G09G 2360/06* (2013.01)

(58) Field of Classification Search
None
See application file for complete search history.

(56) References Cited

U.S. PATENT DOCUMENTS

| | | | |
|---|---|---|---|
| 5,577,188 A | 11/1996 | Zhu | |
| 8,375,316 B2 | 2/2013 | Stallings et al. | |
| 8,910,163 B1* | 12/2014 | Grechishkin | G06F 9/445 718/1 |
| 9,189,264 B1 | 11/2015 | Steffen | |
| 9,219,749 B2 | 12/2015 | Khalsa et al. | |
| 9,223,598 B1 | 12/2015 | Koryakina et al. | |
| 2009/0289916 A1* | 11/2009 | Dai | G06F 3/04883 345/173 |
| 2011/0271185 A1 | 11/2011 | Chen et al. | |
| 2012/0099024 A1* | 4/2012 | Ryu | H04N 21/4586 348/730 |
| 2014/0223432 A1 | 8/2014 | Halim et al. | |
| 2014/0259011 A1 | 9/2014 | Yashiro et al. | |
| 2015/0178198 A1* | 6/2015 | Pratt | G06F 12/08 711/6 |
| 2015/0286389 A1 | 10/2015 | Conover et al. | |
| 2016/0078585 A1* | 3/2016 | Sheldon | G06F 9/45558 345/520 |
| 2016/0110080 A1* | 4/2016 | Bertram | G06F 3/04842 715/753 |
| 2017/0357416 A1* | 12/2017 | Jing | G06F 3/0481 |

OTHER PUBLICATIONS

Chapter 4 Guest Additions, retrieved Feb. 5, 2016, link: https://www.virtualbox.org/manual/ch04.html.

* cited by examiner

*Primary Examiner* — Frank S Chen
(74) *Attorney, Agent, or Firm* — K&L Gates LLP (57) ABSTRACT

The present disclosure provides new and innovative methods and systems for managing transparent guest based notifications in a virtual environment. In a method for controlling the display of information on a client, a hypervisor may connect a virtual graphics card to a virtual machine. The hypervisor may receive a render request from the virtual graphics card and responsive to receiving the render request, an overlay is drawn. The hypervisor sends an overlay command and detects an input event affecting the overlay. Responsive to detecting the input event the hypervisor, updates the overlay.

20 Claims, 8 Drawing Sheets

TRANSPARENT GUEST BASED NOTIFICATION OVERLAY

BACKGROUND

The present disclosure relates generally to display management in virtualized systems utilizing virtual machines and host devices. Virtualization may be used to provide some physical components as logical objects in order to allow running various software modules, for example, multiple operating systems, concurrently and in isolation from other software modules, on one or more interconnected physical computer systems.

A hypervisor may run on the hardware without an operating system beneath it or it may run as an application running on a traditional operating system. A hypervisor may virtualize the physical layer and provide an interface between the underlying hardware and a virtual machine. A hypervisor may control one or more virtual machines.

SUMMARY

The present disclosure provides new and innovative methods and systems for managing transparent guest based notifications in a virtual environment. In an example method for controlling the display of information on a client, a hypervisor may connect a virtual graphics card to a virtual machine. The hypervisor may receive a render request from the virtual graphics card and responsive to receiving the render request, an overlay is drawn. The hypervisor sends an overlay command and detects an input event affecting the overlay. Responsive to detecting the input event the hypervisor, updates the overlay.

Additional features and advantages of the disclosed method and apparatus are described in, and will be apparent from, the following Detailed Description and the Figures.

DETAILED DESCRIPTION

Techniques are disclosed for the creation of and display of guest based notifications. In a virtual machine environment, a user of the virtual machine may use a client to access the virtual machine. The virtual machine may include virtual processors and virtual memory, and may run a virtual operating system. Actions the virtual machine takes are managed by a hypervisor. The hypervisor connects the virtual machine with nodes which may contain communicatively coupled memory devices and one or more physical processors.

A hypervisor may need to communicate information to the user of a virtual machine based on the user's status. Targeted information delivery may be managed by the hypervisor. To deliver information specific to the user of the virtual machine, the hypervisor may need to access information about the user of the virtual machine. The hypervisor controls the memory and processing of the virtual machine and may obtain information about the user by either passively or actively receiving or extracting the information from the virtual machine. The hypervisor may boot an information collection guest, expose the information collection guest to a virtual machine and detect a first guest status. The hypervisor may then communicate targeted information to the user of the virtual machine through an information message.

A virtual machine may have a virtual graphics card that the virtual machine utilizes to control the display to a user of a virtual machine at the client. The virtual graphics card may be managed by the hypervisor. For example, the hypervisor may use the virtual graphics card to manage the display including messages, alerts, advertisements, etc. to a user of a virtual machine. The hypervisor may control various input events for the virtual machine. The hypervisor may correspond mouse clicks, touches on a touch screen and keystrokes to actions to be taken within the virtual machine environment.

The hypervisor may ensure that an overlay is displayed to the user of the virtual machine by inserting the overlay into part of the displayed content so that the client is forced to draw the overlay on the user display as if it were part of the rest of the display. This prevents the client from masking the overlay or taking action to prevent the display of the overlay to the user of the virtual machine. Additionally, if the user is a cooperative user, the forced display may not be necessary.

Figure 1:
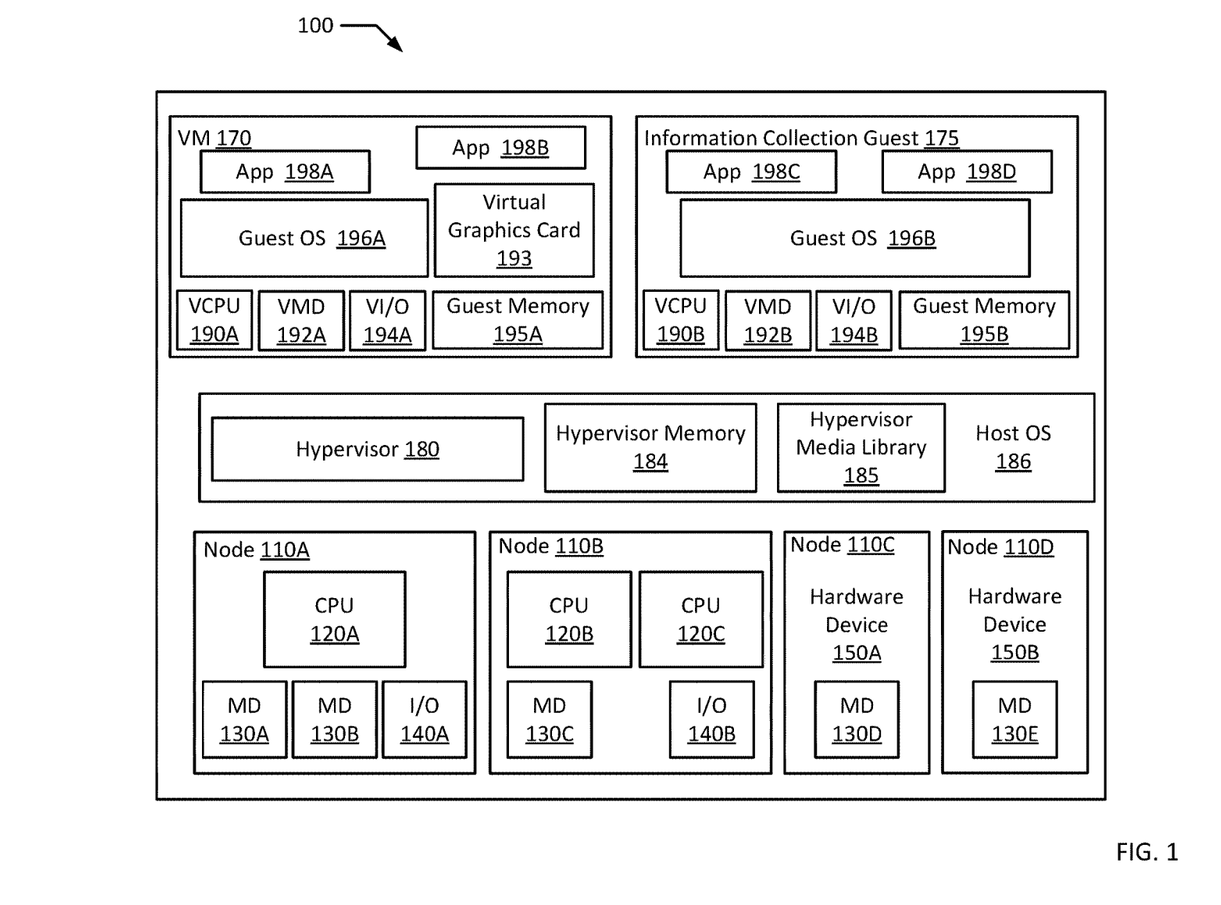
FIG. 1 is a block diagram of a virtual machine system according to an example of the present disclosure.

FIG. 1 depicts a high-level component diagram of an example multi-processor computer system 100 in accordance with one or more aspects of the present disclosure. The computer system 100 may include one or more interconnected nodes 110A-D. Each node 110A-B may in turn include one or more physical processors (e.g., CPU 120A-C) communicatively coupled to memory devices (e.g., MD 130A-C) and input/output devices (e.g., I/O 140A-B). Each node 110C-D may include a hardware device 150A-B and a memory device 130D-E. In an example, a hardware device (e.g., 150A-B) may include a network device (e.g., a network interface controller (NIC), a network adapter, or any other component that connects a computer to a computer network), a peripheral component interconnect (PCI) device, storage devices, sound or video adaptors, photo/video cameras, printer devices, keyboards, displays, graphics cards etc. The hardware device 150A-B may be communicatively coupled to a memory device 130D-E.

As used herein, physical processor or processor 120A-C refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-E refers to a volatile or non-volatile memory device, such as RAM, ROM, EEPROM, or any other device capable of storing data. As discussed herein, I/O device 140A-B refers to a device capable of providing an interface between one or more processor pins and an external device, the operation of which is based on the processor inputting and/or outputting binary data.

Processors 120A-C may be interconnected using a variety of techniques, ranging from a point-to-point processor interconnect, to a system area network, such as an Ethernet-based network. Local connections within each node 110A-D, including the connections between a processor 120A and a memory device 130A-B and between a processor 120A and an I/O device 140A may be provided by one or more local buses of suitable architecture, for example, peripheral component interconnect (PCI). As used herein, a device of the host OS 186 (or "host device") may refer to CPU 120A-C, MD 130A-E, I/O 140A-B, a software device, and/or hardware device 150A-B.

As noted above, computer system 100 may run one virtual machine 170, or multiple virtual machines, by executing a software layer (e.g., hypervisor 180) above the hardware and below the virtual machine 170, as schematically shown in FIG. 1. In an example, the hypervisor 180 may be a component of the host operating system 186 executed by the computer system 100. In another example, the hypervisor 180 may be provided by an application running on the operating system 186, or may run directly on the computer system 100 without an operating system beneath it. The hypervisor 180 may virtualize the physical layer, including processors, memory, and I/O devices, and present this virtualization to a virtual machine 170 as devices, including virtual processors 190A, virtual memory devices 192A, and/or virtual I/O devices 194A.

In an example, a virtual machine 170 may execute a guest operating system 196A which may utilize the underlying VCPU 190A, VMD 192A, and VI/O devices 194A. One or more applications 198A-B may be running on a virtual machine 170 under the respective guest operating system 196A. Processor virtualization may be implemented by the hypervisor 180 scheduling time slots on one or more physical processors 120A-C such that from the guest operating system's perspective those time slots are scheduled on a virtual processor 190A.

A virtual machine 170 may run on any type of dependent, independent, compatible, and/or incompatible applications on the underlying hardware and OS 186. In an example, applications 198A-B run on a virtual machine 170 may be dependent on the underlying hardware and/or OS 186. In another example, applications 198A-B run on a virtual machine 170 may be independent of the underlying hardware and/or OS 186. Additionally, applications 198A-B run on a virtual machine 170 may be compatible with the underlying hardware and/or OS 186. In an example, applications 198A-B run on a virtual machine 170 may be incompatible with the underlying hardware and/or OS. In an example, a device may be implemented as a virtual machine 170. The hypervisor 180 manages hypervisor memory 184 for the host operating system 186 as well as memory allocated to the virtual machine 170 and guest operating system 196 such as guest memory 195 provided to guest OS 196. Host memory 184 and guest memory 195 may be divided into a plurality of memory pages that are managed by the hypervisor 180. Guest memory 195 allocated to the guest OS 196 is mapped from host memory 184 such that when a guest application 198A-B uses or accesses a memory page of guest memory 195 it is actually using or accessing host memory 184.

An information collection guest 175 may run on any type of dependent, independent, compatible, and/or incompatible applications on the underlying hardware and OS 186. In an example, applications 198C-D run on an information collection guest 175 may be dependent on the underlying hardware and/or OS 186. In another example, applications 198C-D run on an information collection guest 175 may be independent of the underlying hardware and/or OS 186. Additionally, applications 198C-D run on an information collection guest 175 may be compatible with the underlying hardware and/or OS 186. In an example, applications 198C-D run on an information collection guest 175 may be incompatible with the underlying hardware and/or OS. The hypervisor 180 may virtualize the physical layer, including processors, memory, and I/O devices, and present this virtualization to an information collection guest 175 as devices, including virtual processors 190B, virtual memory devices 192B, and/or virtual I/O devices 194B.

The hypervisor memory 184 may contain a hypervisor media library 185. The hypervisor media library 185 may be located in a node 110A-D. The hypervisor media library may not be modified by a virtual machine 170 or the client used to access the virtual machine 170. The hypervisor media library may contain applications 198A-D to be used by a virtual machine 170 and/or an information collection guest 175. The hypervisor media library 185 may contain an information collection guest 175. In an example, the hypervisor 180 may boot an information collection guest 175 from the hypervisor media library 185 and expose the information collection guest 175 to the virtual machine 170. The information collection guest 175 may contain applications 198C-D. Additionally, the information collection guest 175 may be an application 198A-B booted by the hypervisor 180 from the hypervisor media library 185 and exposed to the virtual machine 170.

The information collection guest 175 may be a virtual machine 170. The information collection guest 175 may be configured to be controlled by the hypervisor 180. The information collection guest 175 may be exposed to the virtual machine 170 or to many virtual machines.

The hypervisor 180 may connect or expose additional virtual devices or virtual machines to each virtual machine 170. For example, a virtual machine 170 may be connected to a virtual graphics card 193. The virtual graphics card 193 may be configured to send a render request to the hypervisor 180.

Figure 2A:
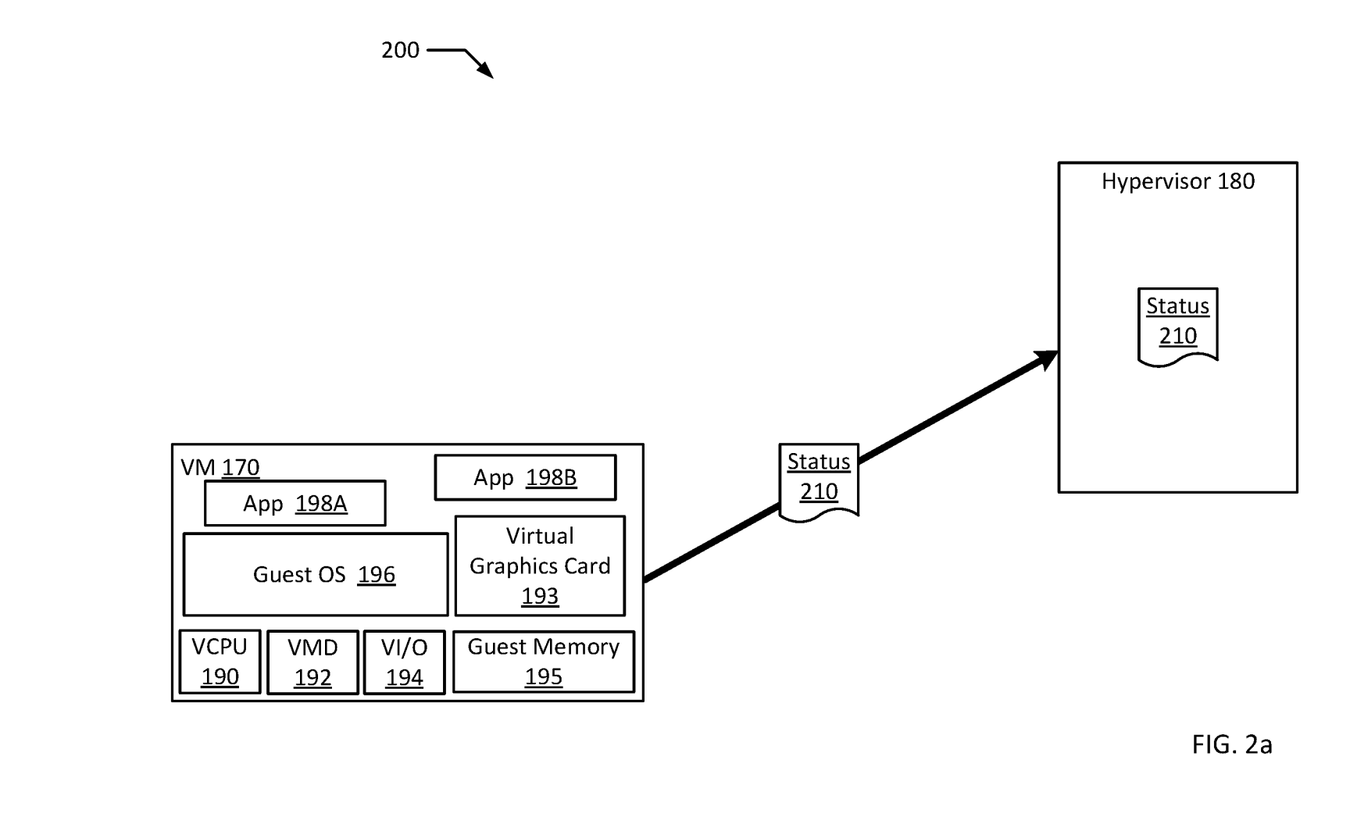
FIG. 2a is a block diagram of an example generation of an information message according to an example of the present disclosure.

FIG. 2a is a block diagram of an example generation process 200 of an information message according to an example of the present disclosure. FIG. 2a depicts the receipt of a first guest status 210 by a hypervisor 180. For example, the hypervisor 180 receives a first guest status 210 from a virtual machine 170. The first guest status 210 may be from an information collection guest 175. The information collection guest 175 may extract a first guest status 210 from the memory of a virtual machine 170. Alternatively, the information collection guest 175 may passively receive the first guest status 210 from the memory of a virtual machine 170.

Figure 2B:
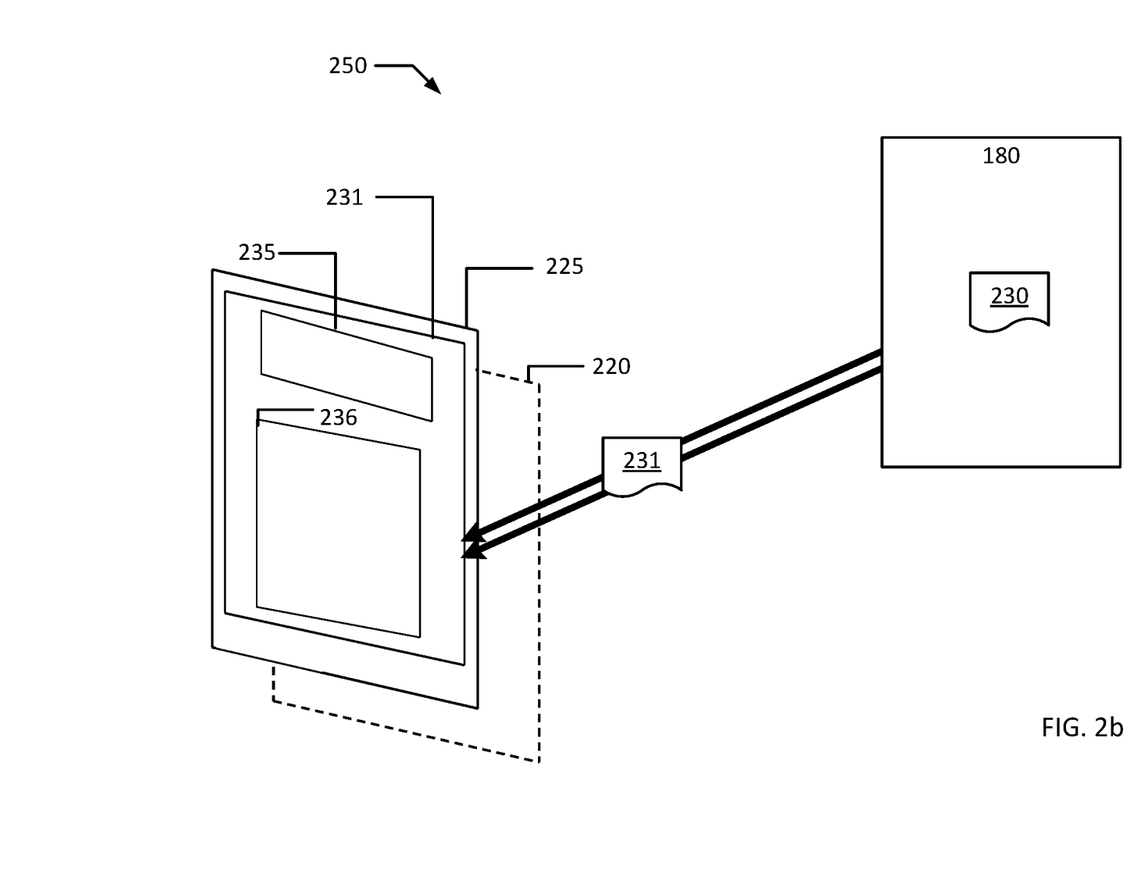
FIG. 2b is a block diagram of an example display of an overlay according to an example of the present disclosure.

FIG. 2b is a block diagram of an example display process 250 of an overlay 231 according to an example of the present disclosure. FIG. 2b depicts sending an overlay 231 to a message display agent 225. For example, the hypervisor 180 sends an overlay 231 to the message display agent 225. The overlay 231 may include an information message 230. The message display agent 225 may be part of a client 220 that is accessing the virtual machine 170. The message display agent 225 may be part of a virtual machine 170. Alternatively, the message display agent 225 may be part of the hypervisor 180. In an example, the message display agent 225 is part of the hypervisor 180 and the hypervisor 180 transforms an information message 230 and controls the display of the overlay 231. The overlay 231 may include an information message 230 and an overlay command. The overlay command may include a render command. The information message 230 may include a guest action portion 235 and an information portion 236. The overlay 231 may be displayed via a message display agent 225. The hypervisor 180 controls the display of the overlay 231, thus the client 220 may not control the display of the overlay 231. The overlay 231 is an integrated part of the displayed content provided to the display agent 225 and the client 220 may not select which portions of the display content to display. The information message 230 may be inserted into the display created in the virtual graphics card 193 as opposed to a separate display created for a message.

Figure 3A:
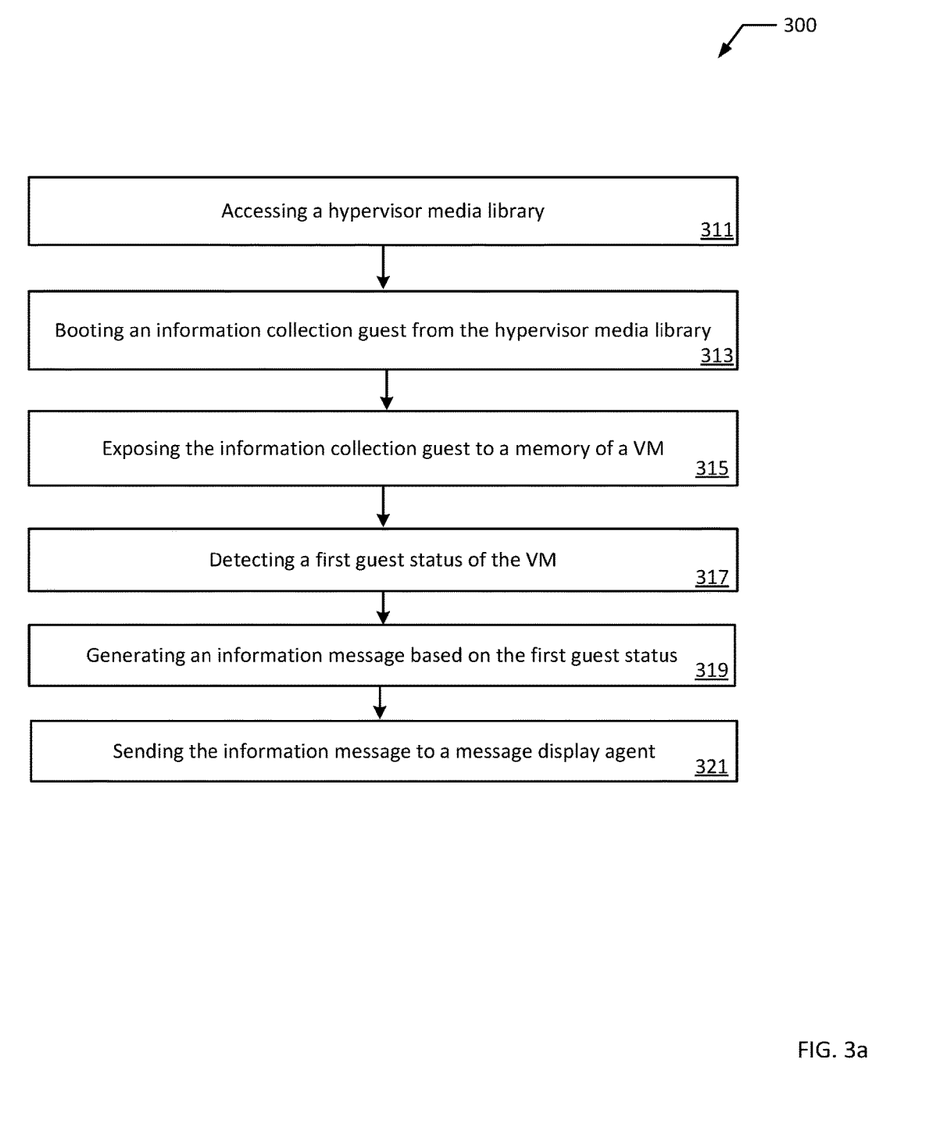
FIG. 3a is a flowchart illustrating an example method for information message management according to an example of the present disclosure.

FIG. 3a is a flowchart illustrating an example method for information message management according to an example of the present disclosure. Although the example method 300 is described with reference to the flowchart illustrated in FIG. 3a, it will be appreciated that many other methods of performing the acts associated with the method 300 may be used. For example, the order of some of the blocks may be changed, certain blocks may be combined with other blocks, and some of the blocks described are optional. In an example, the method 300 may be performed by processing logic that may comprise hardware (circuitry, dedicated logic, etc.), software, or a combination of both. In an example, the method is performed by a hypervisor 180.

The example method 300 starts with a hypervisor 180 accessing a hypervisor media library 185 (block 311). The hypervisor media library 185 may be located within the hypervisor memory 184, within node 110C-D, or within a memory device 130A-C located within node 110A-B. The example method 300 continues by the hypervisor 180 booting an information collection guest 175 from the hypervisor media library 185 (block 313). In an example, the information collection guest 175 is a virtual machine 170. In another example, the information collection guest 175 is an application 198A-B. Then the hypervisor 180 exposes the information collection guest 175 to a memory of a virtual machine 170 (block 315). By exposing the information collection guest 175 to the memory of a virtual machine 170, the information collection guest 175 may access the memory of the virtual machine 170 without disturbing the virtual machine 170. The memory of the virtual machine 170 may be the virtual memory 192 which may be provided in RAM or more typically a magnetic or optical disk that the virtual machine 170 accesses. In an example, an advantage of accessing the disk memory that the virtual machine 170 has access to is that the hypervisor 180 may know the locations within the memory, allowing for faster retrieval of the first guest status 210. In another example, an advantage of accessing the RAM that the virtual machine 170 has access to is that the information stored within the RAM may be more current, allowing for a more up-to-date or current first guest status 210. Further, the memory may be any guest memory 195 or hypervisor memory 184 associated with the virtual machine 170.

The hypervisor 180 then detects a first guest status 210 of a virtual machine 170 (block 317). The information collection guest 175 may extract a first guest status 210 from the memory of a virtual machine 170. Alternatively, the information collection guest 175 may passively receive a first guest status 210 from the memory of a virtual machine 170. The information collection guest 175 may use applications 198C-D to extract a first guest status 210 or to receive a first guest status 210.

The first guest status 210 may be any status about the virtual machine 170. More specifically the information collection guest 175 or an application 198C-D that is part of the information collection guest 175 may check the file system (e.g., the windows file system, a remote file system, a mounted file system) or the presence of encryption on a virtual machine 170. Further, the first guest status 210 may reflect the guest operating system 196 on the virtual machine 170. The first guest status 210 may be the operating system of the client 220 accessing the virtual machine 170. The first guest status 210 may be an entry in an operating system registry of the guest OS 196A-B of the virtual machine 170. The first guest status 210 may be a file type, programming language or native language (e.g., English, Spanish, Russian) of an application 198A-B or file accessed by the virtual machine 170. The first guest status 210 may further be based upon the applications 198A-B used by the virtual machine 170 or installed on the client 220 accessing the virtual machine 170. The first guest status 210 may further reflect any peripheral component interconnect (PCI) device, storage devices, sound or video adaptors, photo/video cameras, printer devices, keyboards, displays, etc. that are connected to or accessed by the client 220 or virtual machine 170. The first guest status 210 may be based upon information gathered from a document accessed by the virtual machine 170 if the documents were not encrypted. The first guest status 210 may also be based upon the user history (e.g., browsing history, file history, login history or any other history associated with the user or client 220 of the virtual machine 170) of the virtual machine 170 or the client 220 using the virtual machine 170.

If the information collection guest 175 actively extracts the first guest status 210 from the memory of a virtual machine 170, the information collection guest 175, or an application 198C-D that is part of the information collection guest 175, may do so without disturbing the virtual machine 170. If the information collection guest 175 actively requests a first guest status 210 from the memory of a virtual machine 170, the information collection guest 175 or an application 198C-D, may send a request or a command to the virtual machine 170. Alternatively, the information collection guest 175 or an application 198C-D which is part of the information collection guest 175, may observe a first guest status 210 from the virtual machine 170. Thus the hypervisor 180 detects the first guest status 210 from the information collection guest 175 after the information collection guest 175 extracts or receives the first guest status 210 from the virtual machine 170.

The hypervisor 180 then generates an information message 230 based on the first guest status 210 (block 319). In one example, the hypervisor 180 may perform a database look-up using the first guest status 210 to determine the first information message 230. The database may be located in the hypervisor memory 184 or the hypervisor media library 185. The database may be located in a memory device 130A-E. An example look-up may include using a table. For example, a table may include the most up-to-date version of an operating system, an application, or some other versioned software. The hypervisor 180 may compare the first guest status 210, which may be the version of the software that the information collection guest 175 extracted from the virtual machine 170, with the most up-to-date version of the software. For example, a table may include keywords if the first guest status 210 was based upon browsing history of the virtual machine 170 or on files that are accessed by the virtual machine 170. In an example, the hypervisor 180 may create the information message 230 based on the first guest status 210.

The information message 230 may be selected from a bank of a plurality of stored information messages 230 based upon a first guest status 210. The bank of stored information messages 230 may be located in any memory accessible by the hypervisor 180.

The information message 230 may contain an information portion 236 and a guest action portion 235. The information message 230 may be a notification, for example, a notification of an upgrade availability or an update alert notifying the user of the virtual machine 170 that an update is available. The update may be a new version of an operating system, an updated application, or other versioned software. Additionally, the update alert may be a status update about the virtual environment. The information message 230 may include hypervisor information, for example advertisements which may be used to promote services the hypervisor 180 may provide or updates about the status of the hypervisor 180. The hypervisor information may include a hypervisor status (e.g., memory usage, CPU usage, network conditions, hardware conditions). The hypervisor status may include potential hypervisor downtime (e.g., Friday from 10:00 to 11:00). The information message 230 may include advertisement information targeting the client 220 of the virtual machine 170. The guest action portion 235 may include a discard portion and/or an action or access portion.

The hypervisor 180 sends the information message 230 to a message display agent 225 (block 321). The message display agent 225 may be part of a client 220 that is accessing the virtual machine 170. The message display agent 225 may be part of a virtual machine 170. Alternatively, the message display agent 225 may be part of the hypervisor 180. In an example, the message display agent 225 is part of the hypervisor 180 and the hypervisor transforms the information message 230 and controls the display of the information message 230. The hypervisor 180 may further transform the information message 230. In another example, the message display agent 225 is part of the client 220 accessing the virtual machine 170 and the hypervisor 180 sends the information message 230 to the client 220 directly. In another example, the message display agent 225 is part of the virtual machine 170 and the information message 230 is sent to the guest operating system 196. The hypervisor 180 controls what is displayed at the client 220 accessing the virtual machine 170 via a user display. Thus, the client 220 may not independently control the information message 230. For example, the client 220 may not have the ability to choose to display the information message 230, while displaying the regular content. The information message 230 is displayed at the client 220 accessing the virtual machine 170 as part of the graphic display, which forces the client 220 to display the information message 230 along with the rest of the regular content on a user display. The client 220 cannot selectively choose to display the regular content without the information message 230, as the information message 230 is drawn as part of the regular content, not as a separate message.

Figure 3B:
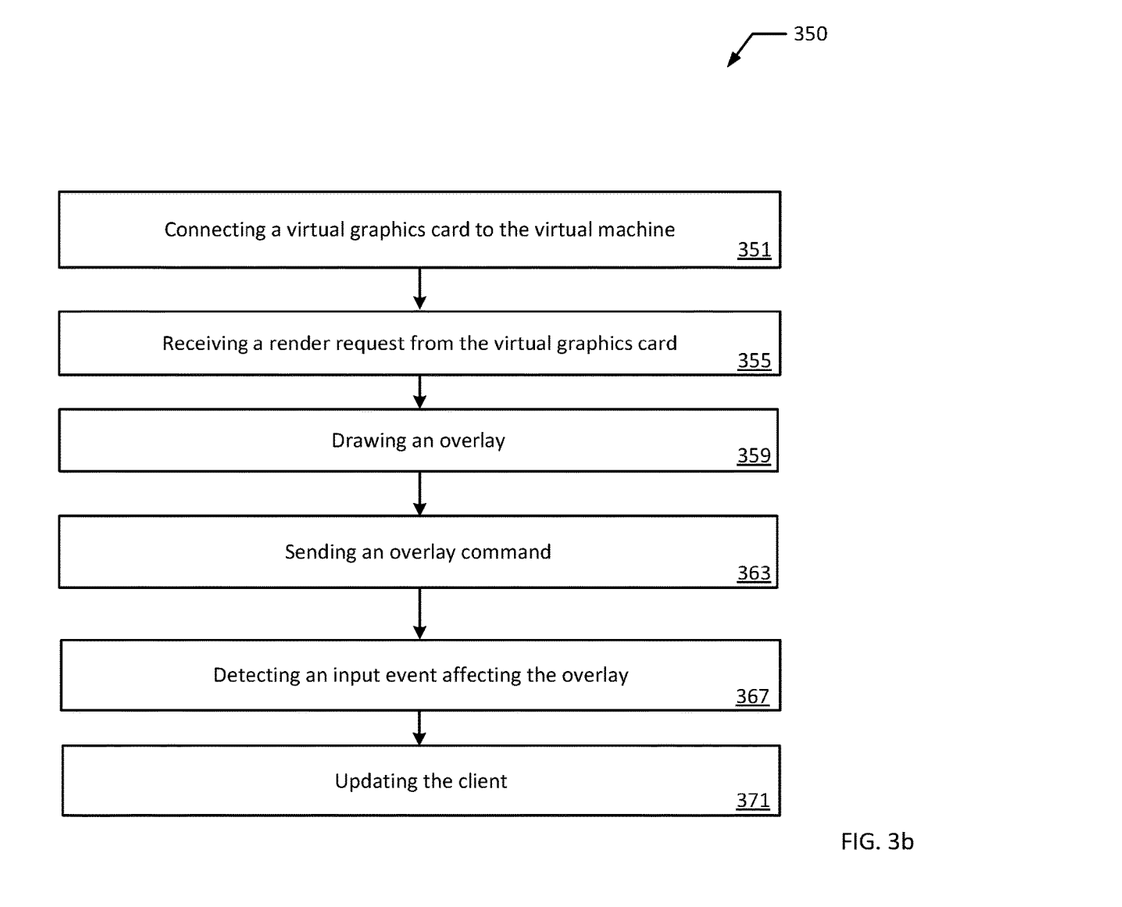
FIG. 3b is a flowchart illustrating an example method for controlling the display of an overlay according to an example of the present disclosure.

FIG. 3b is a flowchart illustrating an example method for controlling the display of an overlay according to an example of the present disclosure. Although the example method 350 is described with reference to the flowchart illustrated in FIG. 3b, it will be appreciated that many other methods of performing the acts associated with the method 350 may be used. For example, the order of some of the blocks may be changed, certain blocks may be combined with other blocks, and some of the blocks described are optional. In an example, the method 350 may be performed by processing logic that may comprise hardware (circuitry, dedicated logic, etc.), software, or a combination of both. In an example, the method is performed by a hypervisor 180.

The example method 350 starts with a hypervisor 180 connecting a virtual graphics card 193 to a virtual machine 170 (block 351). The hypervisor 180 receives a render request from the virtual graphics card 193 (block 355). For example, the virtual graphics card 193 may send the render request to the hypervisor 180 in response to a command from a virtual machine 170. Also, for example, the virtual graphics card 193 may send the render request in response to a command from the hypervisor 180. The virtual graphics card 193 may send the render request to the hypervisor 180 as part of the display update after the client 220 changes the display through a command (e.g., a scroll command, a keystroke command, a mouse movement, a selection of a link etc.). Then the hypervisor 180 draws an overlay 231 (block 359). The hypervisor 180 may draw the overlay 231 itself or the hypervisor 180 may command a graphics card to draw the overlay 231. The graphics card may be located in node 110A-D or the graphics card may be a virtual graphics card 193. The hypervisor 180 may command the client 220 to draw the overlay 231.

The hypervisor 180 sends the drawn overlay 231 and an overlay command (block 363). The overlay command may include a render command. The hypervisor 180 may send the drawn overlay 231, an overlay command and a render command to the message display agent 225. In an example, the message display agent 225 may be part of a client 220 that is accessing the virtual machine 170. In another example, the message display agent 225 may be part of the virtual machine 170. In another example, the message display agent 225 may be part of the hypervisor 180. The overlay 231 may include the information message 230, the overlay command, and the render command. The overlay 231 may be a message to be displayed on top of the virtual machine 170 display. The overlay 231 may include an information message, a timer notification, a memory use status, an upgrade request or status, a downtime notification, a network status, an offer for sale, an update request or status, a conversation window, a chat window, an advertisement, etc.

The display of the overlay 231 happens where the hypervisor 180 commands the display to occur without input from the client 220. The display does not interfere with the functional use of the virtual machine 170 by the client 220. However, the client 220 is unable to mask the overlay 231 or prevent the display of the overlay 231 with the normal display provided by the virtual machine 170, as the overlay 231 is drawn in as part of the display that the client 220 receives. Thus the client 220 may be unaware that the overlay 231 is being displayed.

The hypervisor 180 detects an input event affecting the overlay 231 (block 367). It should be appreciated that one possible example of an overlay 231 is an information message 230. The guest action portion 235 of an information message 230 may include a discard portion or an action portion. An input event is detected by the hypervisor 180 as the hypervisor controls the display of the information message 230 on the client 220. The input event may be detected by the client 220 and sent to the hypervisor 180. In an example, the input event may be a discard event. In another example, the input event may be an action event. Also, the input event may be a mouse click, a touch on a touch screen, or a keystroke. The client 220 may detect the location of the input event within the information message 230, more specifically, where in the guest action portion 235 the input event occurs. The client 220 sends the input event and location to the hypervisor 180. For example, the input event may be a discard event, e.g., a mouse click on a discard portion or a keystroke of the escape key. If the client 220 detects a mouse click at a first location, the client 220 sends the event, the mouse click, including the first location to the hypervisor 180. The hypervisor 180 knows the location of the discard portion in a guest action portion 235 of the information message 230, and the hypervisor 180 detects that mouse click as a discard event.

In another example, the input event may be an action event e.g., a mouse click on a download link or a mouse click on an access link. If the client 220 detects a mouse click at a second location, the client 220 sends the event, the mouse click, including the location to the hypervisor 180. The hypervisor 180 knows the location of the action portion within the information message 230, and the hypervisor 180 detects the mouse click as an input event in the guest action portion 235 and interprets that as an action event. The hypervisor 180 may utilize location matching to compare where the touch or mouse click occurs and match the location of the input event to a location within the guest action portion 235 of the information message 230.

The hypervisor 180 updates the client 220 (block 371). For example, updating may include removing the overlay 231 from the display if the input event is a discard event. There may be a time delay that prevents the immediate removal of the overlay 231. This time delay may cause the continued display of the overlay 231 after the hypervisor 180 detects the input event. The time delay may last for a few seconds or a few minutes. The time delay may be accompanied by an updated or additional overlay 231 that displays a countdown until the removal of one overlay or both overlays. For another example, updating may include providing access to new information such as changing the overlay 231 to include a new display of new information if the input event is an action event. The new information may be an action such as the display of a web site as a result of a mouse click on an access link or URL. The update may include removing the overlay 231 and initiating a system update or application update. The update may include initiating a download if the input event is an action event. The update may include creating an overlay 231 based on a second guest status. Updates may be in the form of new information messages 230. Also, updates may be in the form of new render requests without the overlay 231 sent with the new render command, effectively changing the display at the client 220.

If the input event is an action event, the client 220 may be deemed cooperative and a forced display to the client 220 may no longer be necessary. If the client 220 is deemed cooperative, an action event may be sent on its own to the virtual machine 170, the hypervisor 180 is not forcing the display of the overlay 231 to the client 220, but rather, the virtual machine 170 handles the action event.

Figure 4A:
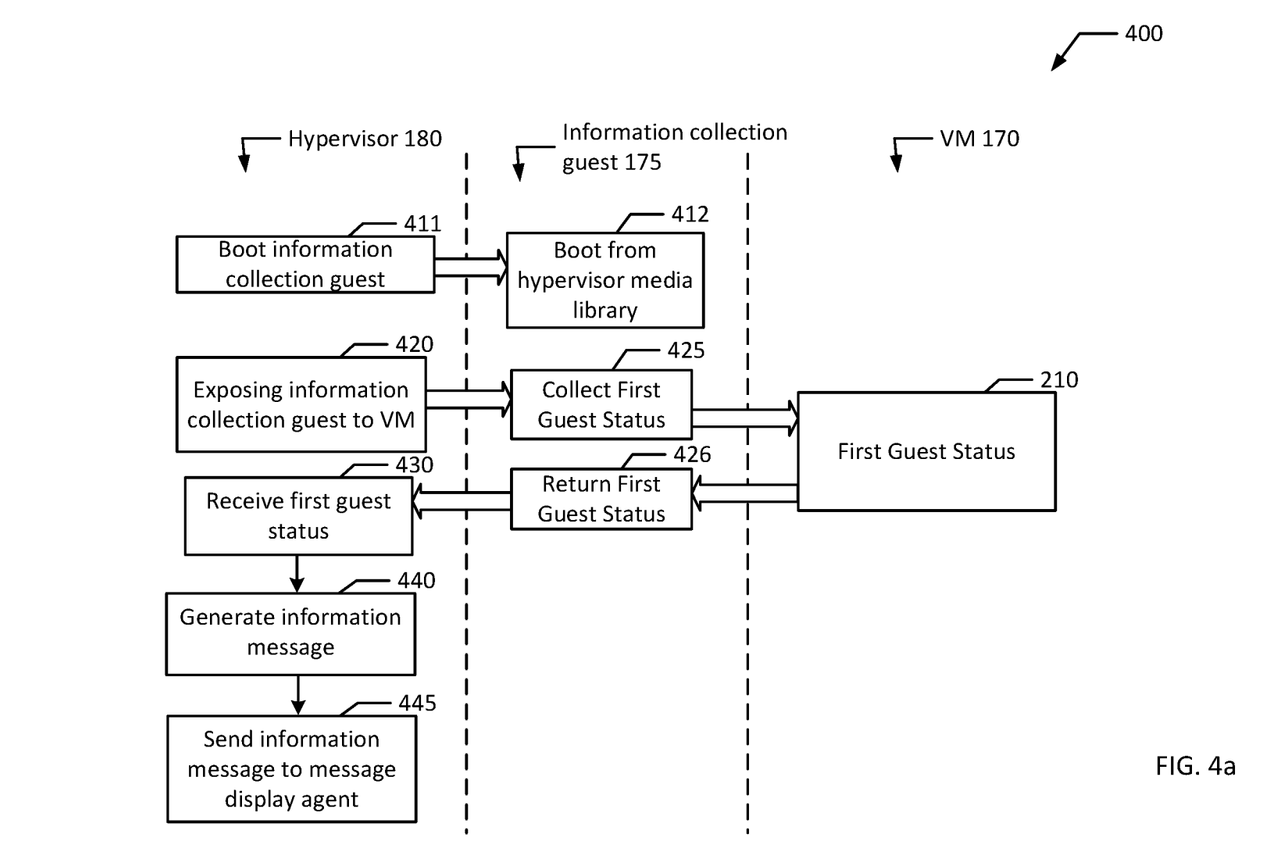
FIG. 4a is a flowchart illustrating an example method for information message management including a hypervisor, information collection guest, and virtual machine according to an example of the present disclosure.

FIG. 4a illustrates a flow diagram of an example method for information message management according to an example of the present disclosure. Although the example method 400 is described with reference to the flow diagram illustrated in FIG. 4a, it will be appreciated that many other methods of performing the acts associated with the method 400 may be used. For example, the order of some of the blocks may be changed, certain blocks may be combined with other blocks and some of the blocks described are optional. The method 400 may be performed by processing logic that may comprise hardware (circuitry, dedicated logic, etc.), software, or a combination of both.

In the illustrated example, a hypervisor 180 is in communication with an information collection guest 175 and a virtual machine 170. The hypervisor 180 boots the information collection guest 175 from the hypervisor media library 185 (block 411). The hypervisor media library 185 may be located within the hypervisor memory 184 or within a memory device 130A-C. In an example, the information collection guest 175 is a virtual machine 170 which is booted from the hypervisor media library 185 (block 412).

The hypervisor 180 exposes the information collection guest 175 to a memory of a virtual machine 170 (block 420). By exposing the information collection guest 175 to the memory of a virtual machine 170, the information collection guest 175 may access the memory of the virtual machine 170 without disturbing the virtual machine 170. The memory of the virtual machine 170 may be the virtual memory 192 which may be provided in RAM or more typically a magnetic or optical disk that the virtual machine 170 accesses. In an example, an advantage of accessing the disk memory that the virtual machine 170 has access to is that the hypervisor 180 may know the locations within the memory, allowing for a faster retrieval of the first guest status. In another example, an advantage of accessing the RAM that the virtual machine 170 has access to is that the information stored within the RAM may be more current, allowing for a more up-to-date first guest status. Further, the memory may be any guest memory 195 or hypervisor memory 184 associated with the virtual machine 170.

The information collection guest 175 collects a first guest status 210 from the virtual machine 170 (block 425). The information collection guest 175 may extract a first guest status 210 from the memory of a virtual machine 170. Alternatively the information collection guest 175 may passively receive a first guest status 210 from the memory of a virtual machine 170. The information collection guest 175 may use applications 198C-D to extract a first guest status 210 or to receive a first guest status 210.

The first guest status 210 may be any status about the virtual machine 170. More specifically the information collection guest 175 or an application 198C-D that is part of the information collection guest 175 may check the file system (e.g., the windows file system, a remote file system, a mounted file system) or the presence of encryption on a virtual machine 170. Further, the first guest status 210 may reflect the guest operating system 196 on the virtual machine 170. The first guest status 210 may be the operating system of the client 220 accessing the virtual machine 170. The first guest status 210 may be an entry in an operating system registry of the guest OS 196A-B of the virtual machine 170. The first guest status 210 may be a file type, programming language or native language (e.g., English, Spanish, Russian) of an application 198A-B or file accessed by the virtual machine 170. The first guest status 210 may further be based upon the applications 198A-B used by the virtual machine 170 or installed on the client 220 accessing the virtual machine 170. The first guest status 210 may further reflect any peripheral component interconnect (PCI) device, storage devices, sound or video adaptors, photo/video cameras, printer devices, keyboards, displays, etc. that are connected to or accessed by the client 220 or virtual machine 170. The first guest status 210 may be based upon information gathered from a document accessed by the virtual machine 170 if the documents were not encrypted. The first guest status 210 may also be based upon the user history (e.g., browsing history, file history, login history or any other history associated with the user or client 220 of the virtual machine 170) of the virtual machine 170 or the client 220 using the virtual machine 170.

If the information collection guest 175 actively extracts the first guest status 210 from the memory of a virtual machine 170, the information collection guest 175, or an application 198C-D that is part of the information collection guest 175, may do so without disturbing the virtual machine 170. If the information collection guest 175 actively requests a first guest status 210 from the memory of a virtual machine 170, the information collection guest 175 or an application 198C-D, may send a request or a command to the virtual machine 170. Alternatively, the information collection guest 175 or an application 198C-D which is part of the information collection guest 175, may observe a first guest status 210 from the virtual machine 170. The information collection guest 175 then returns the first guest status 210 to the hypervisor 180 (block 426). For example, the first guest status 210 may be any status about the virtual machine 170. The first guest status may be based on the file system (e.g., the windows file system, a remote file system, a mounted file system) or the presence of encryption on a virtual machine 170. Further, the first guest status 210 may reflect the guest operating system 196 on the virtual machine 170. The first guest status 210 may be the operating system of the client 220 accessing the virtual machine 170. The first guest status 210 may be an entry in an operating system registry of the guest OS 196A-B of the virtual machine 170. The first guest status 210 may be a file type, programming language or native language (e.g., English, Spanish, Russian) of an application 198A-B or file accessed by the virtual machine 170. The first guest status 210 may further be based upon the applications 198A-B used by the virtual machine 170 or installed on the client 220 accessing the virtual machine 170. The first guest status 210 may further reflect any peripheral component interconnect (PCI) device, storage devices, sound or video adaptors, photo/video cameras, printer devices, keyboards, displays, etc. that are connected to or accessed by the client 220 or virtual machine 170. The first guest status 210 may be based upon information gathered from a document accessed by the virtual machine 170 if the documents were not encrypted. The first guest status 210 may also be based upon the user history (e.g., browsing history, file history, login history or any other history associated with the user or client 220 of the virtual machine 170) of the virtual machine 170 or the client 220 using the virtual machine 170. The hypervisor 180 receives the first guest status 210 from the information collection guest 175 (block 430).

The hypervisor 180 generates a first information message 230 (block 440). In one example, the hypervisor 180 may perform a database look-up using the first guest status 210 to determine the first information message 230. The database may be located in the hypervisor memory 184 or the hypervisor media library 185. In an example, the database may be located in a memory device 130A-E. An example look-up may include using a table. A possible table may include the most up-to-date version of an operating system, an application or some other versioned software. The hypervisor 180 may compare the first guest status 210, which may be the version of the software that the information collection guest 175 extracted from the virtual machine 170, with the most up-to-date version of the software. In another example, the hypervisor 180 may create the information message 230 based on the first guest status 210. In another example, the table may include keywords if the first guest status 210 was based upon browsing history of the virtual machine 170 or on files that are accessed by the virtual machine 170.

The information message 230 may contain an information portion 236 and a guest action portion 235. The information message 230 may be a notification, for example a notification of an upgrade availability or an update alert notifying the user of the virtual machine 170 that an update is available. The update may be a new version of an operating system, an updated application, or other versioned software. Additionally, the update alert may be a status update about the virtual environment. The information message 230 may include hypervisor information, for example advertisements which may be used to promote services the hypervisor 180 may provide or updates about a hypervisor status. The hypervisor information may include a hypervisor status (e.g., high or low memory usage, CPU over-usage, network conditions, hardware temperatures). The hypervisor status may include potential hypervisor downtime (e.g., Friday from 10:00 to 11:00). The hypervisor information may include potential hypervisor downtime. The information message 230 may include advertisement information targeting the client 220 of the virtual machine 170. The guest action portion 235 may include a discard portion and/or an action or access portion.

The hypervisor 180 sends the information message 230 to a message display agent 225 (block 445). The message display agent 225 may be part of a client 220 that is accessing the virtual machine 170. The message display agent 225 may be part of a virtual machine 170. Alternatively, the message display agent 225 may be part of the hypervisor 180. In an example the message display agent 225 is part of the hypervisor 180 and the hypervisor transforms the information message 230 and controls the display of the information message 230. The hypervisor 180 may further transform the information message 230. In another example, the message display agent 225 is part of the client 220 accessing the virtual machine 170 and the hypervisor 180 sends the information message 230 to the client 220 directly. In another example, the message display agent 225 is part of the virtual machine 170 and the information message 230 is sent to the guest operating system 196. The hypervisor 180 controls what is displayed at the client 220 accessing the virtual machine 170 via a user display. Thus, the client 220 may not independently control the information message 230. For example, the client 220 may not have the ability to choose to display the information message 230, while displaying the regular content. The information message 230 is displayed at the client 220 accessing the virtual machine 170 as part of the graphic display, which forces the client 220 to display the information message 230 along with the rest of the regular content on a user display. The client 220 cannot selectively choose to display the regular content without the information message 230, as the information message 230 is drawn as part of the regular content, not as a separate message.

Figure 4B:
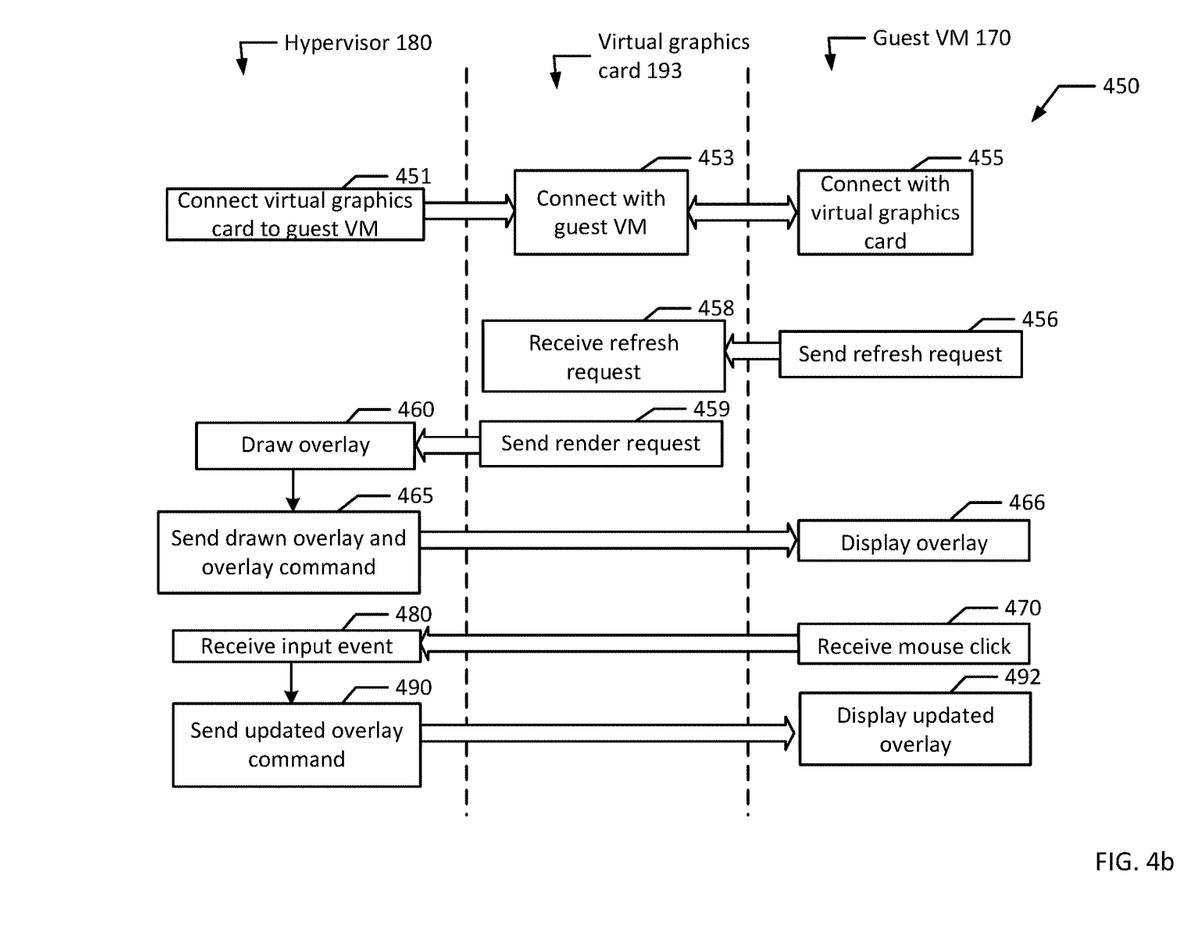
FIG. 4b is a flowchart illustrating an example method for controlling the display of an overlay including a hypervisor, a virtual graphics card, and a virtual machine according to an example of the present disclosure.

FIG. 4b illustrates a flow diagram of an example method for controlling the display of an overlay including a hypervisor, a virtual graphics card and a virtual machine according to an example of the present disclosure. Although the example method 450 is described with reference to the flow diagram illustrated in FIG. 4b, it will be appreciated that many other methods of performing the acts associated with the method 450 may be used. For example, the order of some of the blocks may be changed, certain blocks may be combined with other blocks and some of the blocks described are optional. The method 450 may be performed by processing logic that may comprise hardware (circuitry, dedicated logic, etc.), software, or a combination of both.

The hypervisor 180 connects a virtual graphics card 193 to a virtual machine 170 (block 451). For example, the hypervisor 180 connects a virtual graphics card 193 with a guest virtual machine 170. Then the virtual graphics card 193 and the virtual machine 170 are connected with each other (blocks 453 and 455). For example, once connected, the virtual graphics card 193 may be dedicated to serving the virtual machine 170. The virtual graphics card 193 is configured with processing ability and memory that may be dedicated hardware located in a node or nodes 110A-D.

Alternatively, the virtual graphics card 193 may utilize virtual processing 190 and virtual memory 192 either in a virtual machine 170 dedicated to the virtual graphics card 193 or the virtual machine 170 that the virtual graphics card 193 is connected to.

In one example, the virtual machine 170 may send a refresh request to the virtual graphics card 193 (block 456). The virtual machine 170 may send the refresh request to the virtual graphics card 193 in response to a change to the display through a command (e.g., a scroll command, a keystroke command, a mouse movement, a selection of a link etc.).

The virtual graphics card 193 sends a render request to the hypervisor 180 (block 459). The virtual graphics card 193 may send the render request to the hypervisor 180 as part of the display update after the client 220 changes the display through a command (e.g., a scroll command, a keystroke command, a mouse movement, a selection of a link etc.). The hypervisor 180 draws an overlay 231 (block 460). The hypervisor 180 may draw the overlay 231 itself or the hypervisor 180 may command a graphics card located in node 110A-D to draw the overlay 231. Also, the hypervisor 180 may command the client 220 to draw the overlay 231.

The hypervisor 180 sends the drawn overlay 231 and an overlay command to the virtual machine 170 (block 465). The overlay command may additionally include a render command. The guest virtual machine 170 displays the overlay 231 (block 466). The client 220 accessing the virtual machine 170 displays the overlay 231 via a user display.

Thus, the client 220 may not independently control the information message 230. For example, the client 220 may not have the ability to choose to display the information message 230, while displaying the regular content. The information message 230 is displayed at the client 220 accessing the virtual machine 170 as part of the graphic display, which forces the client 220 to display the information message 230 along with the rest of the regular content on a user display. The client 220 cannot selectively choose to display the regular content without the information message 230, as the information message 230 is drawn as part of the regular content, not as a separate message. The information message 230 includes a guest action portion 235 and an information portion 236.

An input event affecting the overlay 231, such as a mouse click, is received by the virtual machine 170 (block 470) and the hypervisor receives the input event from the virtual machine 170 (block 480). The hypervisor 180 detects what sort of input event the hypervisor 180 received and where the input event occurred.

It should be appreciated that an example of an overlay 231 is an information message 230. The overlay 231 may include the information message 230, the overlay command, and the render command. The overlay 231 may be a message to be displayed on top of the virtual machine 170 display. The overlay 231 may be an information message, a timer notification, a memory use status, an upgrade request or status, a downtime notification, a network status, an offer for sale, an update request or status, a conversation window, a chat window an advertisement, etc.

The guest action portion 235 of the information message 230 may include a discard portion or an action portion. An input event is detected by the hypervisor 180 as the hypervisor controls the display of the information message 230 on the client 220. The input event may be detected by the client 220 and sent to the hypervisor 180. In an example, the input event may be a discard event. In another example, the input event may also be an action event. The input event may be a mouse click, a touch on a touch screen, or a keystroke. A mouse click may be one click or a series or sequence of clicks. A keystroke may be a single key press or keystroke, a series of key presses or keystrokes, a special key or a sequence of key presses or keystrokes. The client 220 may detect the location of the input event within the information message 230, more specifically, where in the guest action portion 235 the input event occurs, and send the input event and location to the hypervisor 180. For example, the input event may be a discard event, such as a mouse click on a discard portion or a keystroke (e.g., the escape key). If the client 220 detects a mouse click at a first location, the client 220 sends the event, the mouse click, including the location to the hypervisor 180. The hypervisor 180 knows the location of the discard portion in a guest action portion 235 of the information message 230, the hypervisor 180 detects that mouse click as a discard event.

In another example, the input event may be an action event, e.g., a mouse click on a download link, a mouse click on an access link, or a keystroke. If the client 220 detects a mouse click at a second location, the client 220 sends the event, the mouse click, including the location to the hypervisor 180. The hypervisor 180 knows the location of the action portion within the information message 230, and the hypervisor 180 detects the mouse click as an input event in the guest action portion 235 and interprets that as an action event. The hypervisor 180 may utilize location matching to compare where the keystroke, touch or mouse click occurs and match the location of the input event to a location within the guest action portion 235 of the information message 230.

The client 220 may send the input event to the hypervisor 180. The input event may include the event location. If the input event is a discard event, the client 220 may send the input event, including the input type and the input location, to the hypervisor 180. The input event location of the discard event may include a sub-area of the overlay 231 where the discard event occurred. In another example, the input even may be an action event. The client 220 may send the input event, including the input type and the input location, to the hypervisor 180. The input event location of the action event may include a sub-area of the overlay 231 where the action event occurred.

In response to receiving the input event (block 480), the hypervisor 180 sends an updated overlay command (block 490). For example, updating may include removing the overlay 231 from the display if the input event is a discard event. There may be a time delay that prevents the immediate removal of the overlay 231. This time delay may cause the continued display of the overlay 231 after the hypervisor 180 detects the input event. The time delay may last for a few seconds or a few minutes. The time delay may be accompanied by an updated overlay 231 that displays a countdown until the removal of both overlays. The update may include providing access to new information such as changing the overlay 231 to include a new display of new information if the input event is an action event. The new information may be an action such as the display of a website as a result of a mouse click on an access link or URL. The update may include removing the overlay 231 and initiating a system update or application update. The update may include initiating a download if the input event is an action event. The update may include creating a new information message 230 based on a second guest status. Updates may be in the form of new information messages 230. Also, updates may be in the form of new render requests without the overlay 231 sent with the new render command, effectively changing the display at the client 220.

If the input event is an action event, the client 220 may be deemed cooperative and a forced display to the client 220 may no longer be necessary. If the client 220 runs the message display agent 225, the client 220 may be deemed cooperative. If the client 220 is deemed cooperative, an action event may be sent on its own to the virtual machine 170, the hypervisor 180 may not force the display of the overlay 231 to the client 220, but rather, the virtual machine 170 may handle the action event.

If the client 220 is a cooperative client 220, the hypervisor 180 may update the client 220 based upon the hypervisor 180 actions. For example, the hypervisor 180 may update the client 220 by updating the display to include a new action window. The action window may include a download status window. For another example, the action window may include a new information window displaying further information. For another example, the hypervisor 180 may update the client 220 by changing the overlay 231 or removing the overlay 231. Updating the client 220 may further include sending an action message to the client 220 after removing or changing the overlay 231.

The action message may be a message prompting the user to take an action or a message reflecting an action the user has taken. For example, the action message may be a message indicating an update frequency or a download status. For another example, the action message may be a message confirming an action the user has taken.

Figure 5:
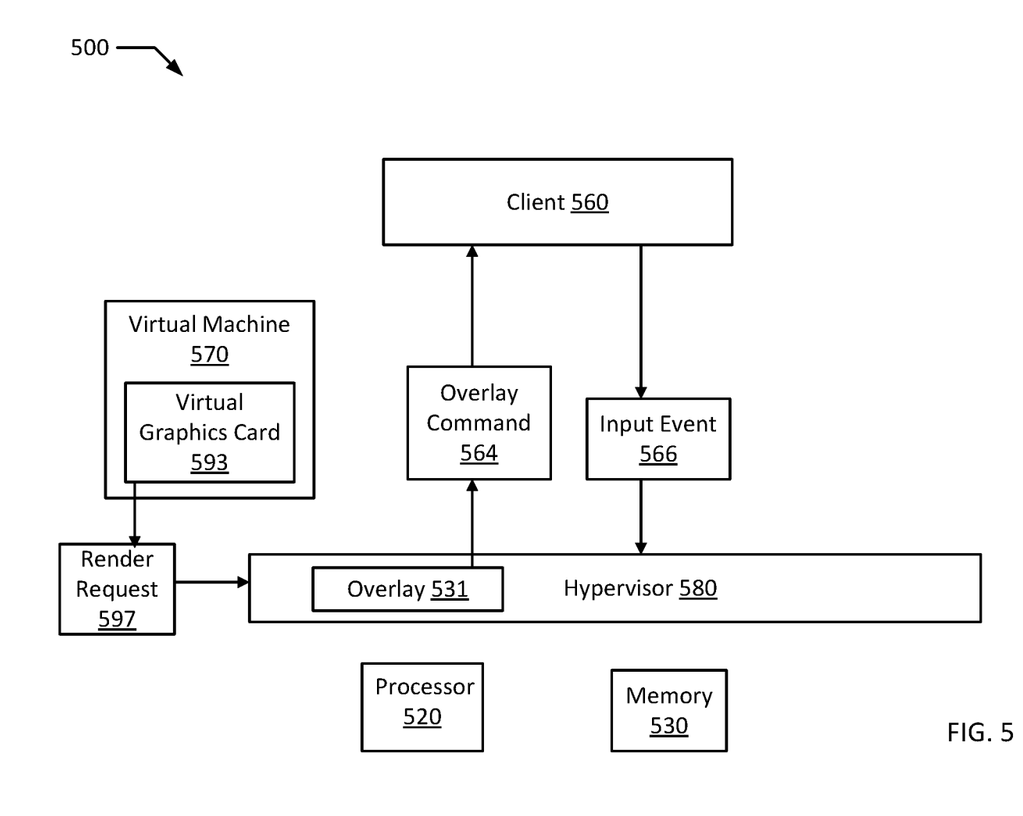
FIG. 5 is a block diagram of an example computer system according to an example of the present disclosure.

FIG. 5 is a block diagram of an example computer system 500 according to an example of the present disclosure. The computer system 500 may include a processor 520 and a memory 530 connected to the processor 520. The computer system 500 may further include a hypervisor 580, a virtual machine 570 and a virtual graphics card 593 executing on the processor 520. The hypervisor 580 may be configured to control a display of information on a client 560. The hypervisor 580 may connect the virtual graphics card 593 to the virtual machine 570. They hypervisor 580 may receive a render request 597 from the virtual graphics card 593. The hypervisor 580 may draw an overlay 531 in response to receiving the render request 597 from the virtual graphics card 593. The hypervisor 580 may draw an overlay 531 and send an overlay command 564. The overlay command 564 may be sent to a message display agent, which is typically running on the client 560 or on the hypervisor 580. Also, in another example, a message display agent may be running on the virtual machine 570. Thus, the overlay 531 may be sent to the client 560, the hypervisor 580, or the virtual machine 570. The hypervisor 580 may detect an input event 566 affecting the overlay 531. The hypervisor 580 may update the client 560 in response to detecting the input event 566. In a typical example, the hypervisor 580 receives the input event 566 before the virtual machine. For example, the hypervisor 580 receives the input event 566 from the client 560 and sends it to the virtual machine 570.

It should be understood that various changes and modifications to the examples described herein will be apparent to those skilled in the art. Such changes and modifications can be made without departing from the spirit and scope of the present subject matter and without diminishing its intended advantages. It is therefore intended that such changes and modifications be covered by the appended claims.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

The invention is claimed as follows:

1. A method for controlling by a hypervisor, a display of information on a client, comprising:
   connecting a virtual graphics card to a virtual machine;
   causing the display of a display content without an overlay at the client, the display content comprising a first portion and a second portion;
   receiving a render request from the virtual graphics card;
   responsive to receiving the render request, drawing the overlay at the first portion of the display content;
   sending the display content comprising the overlay and an overlay command to the client, the overlay command preventing the client from displaying the second portion of the display content without the overlay and containing instructions indicating a location where the overlay is to be displayed at the client;
   causing the display of the overlay at the location along with the second portion of the display content at the client without input from the client;
   detecting an input event affecting the overlay;
   responsive to detecting the input event and based on a type of the input event, determining whether or not the client is deemed cooperative;
   based on the determination of whether or not the client is deemed cooperative, determining which of the hypervisor or the virtual machine should update the client; and
   updating the client, wherein the client is updated with the virtual machine if the client is deemed cooperative, and wherein the client is updated with the hypervisor if the client is not deemed cooperative.

2. The method of claim 1, wherein the drawn overlay includes an information message and wherein the information message includes an information portion and a guest action portion.

3. The method of claim 2, wherein the input event is detected in the guest action portion of the information message, and wherein subject to the input event being a discard event, removing the drawn overlay and subject to the input event being an action event, sending an action message to a guest of the virtual machine.

4. The method of claim 1, wherein the input event is a discard event, the client is not deemed cooperative and, the hypervisor updates the client.

5. The method of claim 4, wherein the overlay is an update request, wherein the discard event is an attempt to close the update request, and wherein based in part on the input event being a discard event the client is not deemed cooperative.

6. The method of claim 5, wherein the client sends an input location to a hypervisor.

7. The method of claim 6, wherein the input event is one of a mouse click and a touch event, and wherein the input event includes an input location.

8. The method of claim 1, wherein the input event is an action event, the client is deemed cooperative, and the virtual machine updates the client.

9. The method of claim 1, wherein the input event is a key press on a keyboard.

10. The method of claim 1, wherein updating the client includes at least one of updating a display to include an action window, changing the overlay, removing the overlay, sending an action message to the client after at least one of removing and changing the overlay.

11. A system for displaying information comprising:
a processor;
a memory;
a virtual graphics card executing on the processor;
a virtual machine executing on the processor; and
a hypervisor executing on the processor to control a display of information on a client by:
connecting the virtual graphics card to the virtual machine;
causing the display of a display content without an overlay at the client, the display content comprising a first portion and a second portion;
receiving a render request from the virtual graphics card;
responsive to receiving the render request, drawing the overlay at the first portion of the display content;
sending the display content comprising the overlay and an overlay command to the client, the overlay command preventing the client from displaying the second portion of the display content without the overlay and containing instructions indicating a location where the overlay is to be displayed at the client;
causing the display of the overlay at the location along with the second portion of the display content at the client without input from the client;
detecting an input event affecting the overlay;
responsive to detecting the input event and based on a type of the input event, determining whether or not the client is deemed cooperative;
based on the determination of whether or not the client is deemed cooperative, determining which of the hypervisor or the virtual machine should update the client; and
updating the client, wherein the client is updated with the virtual machine if the client is deemed cooperative, and wherein the client is updated with the hypervisor if the client is deemed uncooperative.

12. The system of claim 11, wherein the overlay includes an information message and wherein the information message includes an information portion and a guest action portion.

13. The system of claim 12, wherein the input event is an action in the guest action portion of the information message and wherein subject to the input event being a discard event, removing the drawn overlay and subject to the input event being an action event, sending an action message to a guest of the virtual machine.

14. The system of claim 11, wherein the input event is a discard event attempting to close the overlay, the client is not deemed cooperative, and the hypervisor updates the client.

15. The system of claim 11, wherein the input event is an action event, the client is deemed cooperative, and the virtual machine updates the client.

16. The system of claim 11, wherein the client sends a location of the input event to the hypervisor.

17. A non-transitory computer readable medium storing instructions, which when executed, cause a hypervisor to:
connect a virtual graphics card to a virtual machine;
cause the display of a display content without an overlay at the client, the display content comprising a first portion and a second portion;
receive a render request from the virtual graphics card;
responsive to receiving the render request, draw the overlay at the first portion of the display content;
send the display content comprising the overlay command to the client, the overlay command preventing the client from displaying the second portion of the display content without the overlay and containing instructions indicating a location where the overlay is to be displayed at the client;
cause the display of the overlay at the location along with the second portion of the display content at the client without input from the client;
detect an input event affecting the overlay;
responsive to detecting an input event and based on a type of the input event, determine whether or not the client is deemed cooperative;
based on the determination of whether or not the client is deemed cooperative, determining which of the hypervisor or the virtual machine should update the client; and
update the client, wherein the client is updated with the virtual machine if the client is deemed cooperative, and wherein the client is updated with the hypervisor if the client is not deemed cooperative.

18. The non-transitory computer readable medium of claim 17, wherein subject to the input event being a discard event, removing the drawn overlay and subject to the input event being an action event, sending an action message to a guest of the virtual machine.

19. The non-transitory computer readable medium of claim 17, wherein the overlay is an update request.

20. The non-transitory computer readable medium of claim 17, wherein the input event is a discard event, the client is not deemed cooperative, and the hypervisor updates the client.

* * * * *

UNITED STATES PATENT AND TRADEMARK OFFICE
CERTIFICATE OF CORRECTION

PATENT NO. : 10,459,748 B2  
APPLICATION NO. : 15/202307  
DATED : October 29, 2019  
INVENTOR(S) : Tsirkin et al.

Page 1 of 1

It is certified that error appears in the above-identified patent and that said Letters Patent is hereby corrected as shown below:

In the Claims

In Column 17, Line 12 (Claim 4), replace "cooperative and, the" with --cooperative, and the--.

Signed and Sealed this  
Eighteenth Day of February, 2020

Andrei Iancu  
*Director of the United States Patent and Trademark Office*